United States Patent [19]

Strenglein

[11] 3,789,950
[45] Feb. 5, 1974

[54] VEHICLE PROTECTIVE APPARATUS

[75] Inventor: Harry F. Strenglein, Clearwater, Fla.

[73] Assignee: Sperry Rand Corporation, New York, N.Y.

[22] Filed: Mar. 8, 1972

[21] Appl. No.: 232,814

[52] U.S. Cl............ 180/98, 340/33, 340/61, 340/258 A, 343/7 ED, 343/7.3
[51] Int. Cl............................................ B60k 27/00
[58] Field of Search ...... 180/98, 82; 340/33, 258 R, 340/258 A; 343/7 ED, 7.3

[56] References Cited
UNITED STATES PATENTS

| | | | |
|---|---|---|---|
| 3,420,572 | 1/1969 | Bisland | 180/98 |
| 3,687,213 | 8/1972 | Sato et al. | 180/98 |
| 3,684,309 | 8/1972 | Uchiyamada | 180/98 |
| 3,442,347 | 5/1969 | Hodgson et al. | 180/98 |
| 3,689,882 | 9/1972 | Dessailly | 180/98 |
| 2,851,120 | 9/1958 | Fogiel | 180/98 |
| 2,933,726 | 4/1960 | Campbell et al. | 180/98 |
| 3,448,822 | 6/1969 | La Lone et al. | 180/98 |
| 2,603,994 | 9/1971 | Williams | 343/7.3 |
| 3,603,995 | 9/1971 | Howard | 343/7.3 |

*Primary Examiner*—Kenneth H. Betts
*Assistant Examiner*—John P. Silverstrim
*Attorney, Agent, or Firm*—Howard P. Terry

[57] ABSTRACT

A vehicular protective apparatus includes radio means for detection of an impending collision immediately prior to actual contact of a protected vehicle with another vehicle or other object and for the actuation of restraining or other protective devices for the protection of the occupants of the vehicle when the crash actually occurs. Modulated single-port continuous wave, high frequency transmitter-receiver apparatus is employed for processing reflected object signals; obstacle presence, closing differential speed, and minimum range signals are generated. All must be present for actuation of passenger restraints or other protective devices.

7 Claims, 1 Drawing Figure

PATENTED FEB 5 1974   3,789,950
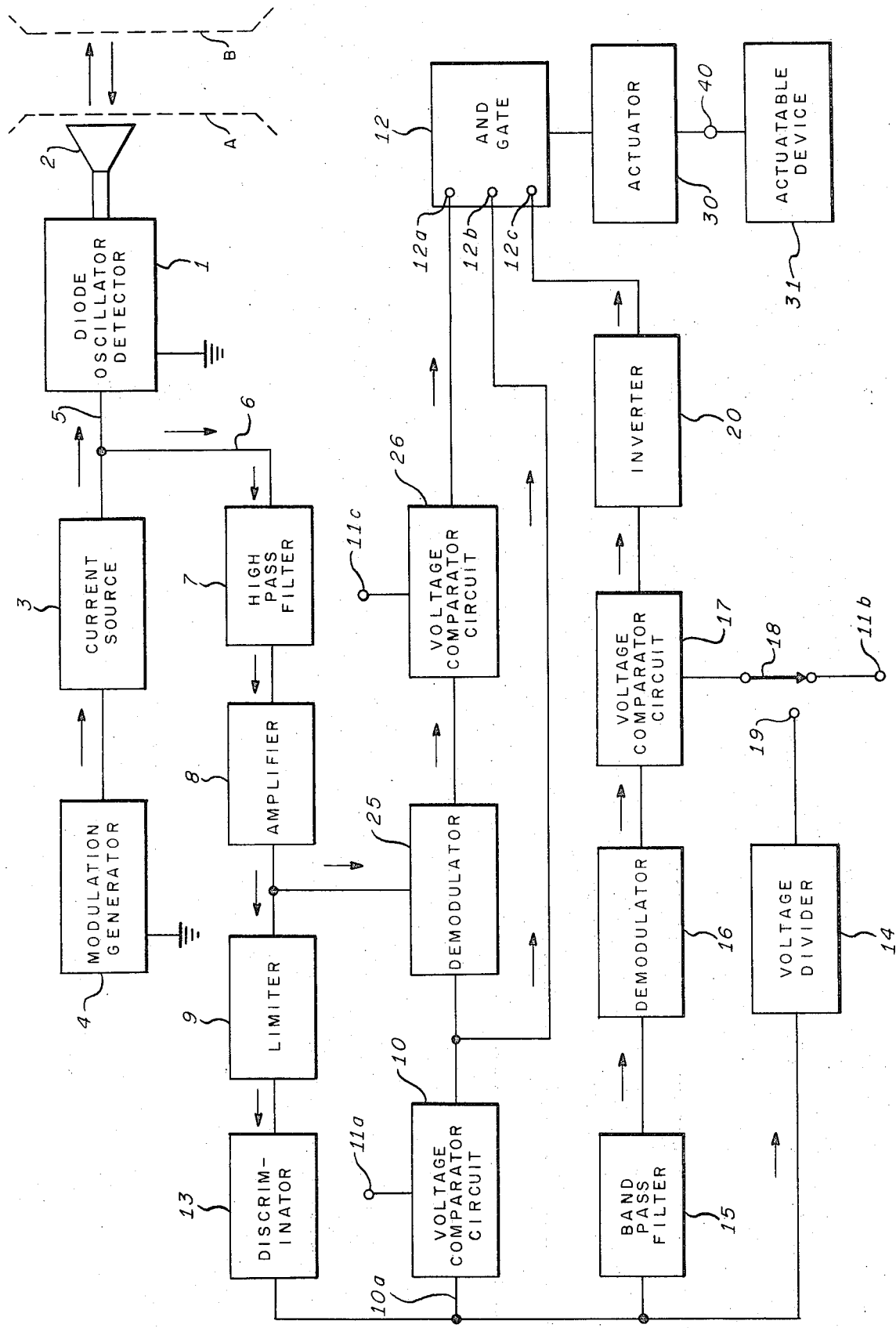

VEHICLE PROTECTIVE APPARATUS

BACKGROUND OF THE INVENTION

1. FIELD OF THE INVENTION

The invention pertains to protective or safety apparatus for the detection of an impending vehicular collision and for the automatic operation of protective devices and more particularly concerns means for utilizing reflected and modulated continuous wave radio signals for the generation of distinct control signals according to the presence, relative speed, and range of the reflecting object with respect to the protected vehicle.

2. DESCRIPTION OF THE PRIOR ART

Prior art devices for protecting vehicle passengers in actual collisions between vehicles or between a vehicle and another object have sought to use crude mechanical sensors in the form of decelerometer-like devices. In theory, such devices operate only after the collision impact occurs; i.e., these prior art devices are not capable of anticipating a crash event. For example, one such mechanical sensor device includes a mass biased in an inactive position against a stop by plural spring contact members. During an actual collision, the mass is designed to move after overcoming the spring bias and then activates a safety device, such as a passenger restraining gas bag. Because such sensors lack the capability of anticipating the crash event, they are actuated, where they do perform reliably, always after the passenger's body has started to move toward the vehicle instrument panel; i.e., the passenger is struck by the gas bag moving toward him relatively faster than the instrument panel and wind screen of the vehicle.

In this and in similar mechanical sensors which have been proposed for safety device actuation, the apparatus is assumed to be always in condition to operate satisfactorily. In fact, it may have remained in a dormant, untended, and untested condition for months or even years. Fail-safe and operability monitoring instrumentalities are not present, and more important, are generally incapable of application to such decelerometer devices, since they are designed as strictly one-shot mechanical devices and do not readily accommodate themselves by nature to testing. While these prior art deceleration sensing devices are theoretically devised to be actuated at a particular impact level, they do not generally demonstrate accurately repeatable and reliable characteristics in actual practice.

SUMMARY OF THE INVENTION

The present invention relates to vehicular protective systems that include unitary radio transmitter-receiver means for the detection of a potential collision of a protected vehicle with another vehicle or other object immediately prior to the actual impact and for actuation of restraining or other safety devices also just prior to the collision for the protection of occupants of the vehicle before the crash event actually occurs. The radio sensor employs directive radio transmission and reception of modulated energy to detect a forwardly located obstacle, measuring predetermined values of obstacle-presence-indicating reflected signal strength, closing differential speed, and range. When such predetermined measured values are simultaneously present, a collision is inevitable, and the coincidence event is used to actuate protective devices. The apparatus is simple and reliable, being substantially immune to false responses.

BRIEF DESCRIPTION OF THE DRAWING

The sole FIGURE is a block diagram of the invention showing electrical connections between its components.

DESCRIPTION OF THE PREFERRED EMBODIMENTS

The sole Figure represents in dotted lines the front of a vehicle or car A in a particular position with respect to the rear of a second vehicle or car B. It will be understood that both of the cars A and B may be moving, and otherwise that relative motion between the two cars may cause car A to move toward car B, thus decreasing the distance between the two vehicles. Should the relative speeds differ and that difference be maintained, a contact between the two vehicles is inevitable. If the maintained relative speed is above a nominal value, substantial collision damage to the cars A and B and to their occupants is a probable consequence. It will be recognized that car B may be a stationary vehicle or may be a normally stationary object such as metal highway barrier or wall.

According to the invention, impending collisions of the above kind with vehicles or other objects are detected for the purpose of operating safety devices of known types for the reduction of damage to one or both vehicles and of injuries to vehicle occupants. For this purpose, there is provided within car A a continuous wave radio transmitter-receiver signalling system for radiating electromagnetic energy toward the rear of car B and for receiving energy reflected therefrom. In the sole Figure the transmitter-receiver signalling system or diode oscillator-detector 1 is coupled to transmit high frequency signals via directive antenna 2 and through space toward any reflecting object that may be present in the radiation pattern of antenna 2 and to collect and process any reflected high frequency signals directed back into antenna 2 from that object. Antenna 2 may be a conventional dipole device or a pyramidal horn, through other directive high frequency antennas are also suitable. Antenna 2 may be situated behind a dielectric grille forming part of the front of the vehicle A.

Oscillator-detector signalling system 1 may be a conventional single-port semiconductor diode oscillator device selected from available conventional types. Diode oscillator devices found suitable include those of the general type shown in the C.T.Rucker U.S. Pat. 3,605,034 for "Coaxial Cavity Negative Resistance Amplifier and Oscillator," issued Sept. 14, 1971, and in the C.T.Rucker U.S. patent application Ser. No. 94,046 for a "Microwave Transducer and Coupling Network," filed Dec. 1, 1970, now U.S. Pat. No. 3,662,285 both inventions being assigned to the Sperry Rand Corporation. Other known diode circuits may be used, including diode oscillator-detector devices such as employ impact avalanche transit time or IMPATT semiconductor diodes and such as employ lumped constant circuits.

The diode within oscillator-detector 1 is supplied via lead 5 in the conventional manner with operating energy from current source 3, but before being placed across that diode, the current amplitude is modulated by a sine wave or other signal arising in modulation generator 4. The small periodic changes in the voltage thus placed across the diode in device 1 produce a relatively low-frequency frequency-modulation of the transmitter carrier signal for purposes yet to be explained.

Any signal by oscillator-detector device 1 is coupled via leads 5 and 6 through a conventional high pass filter 7 to amplifier 8. The detected signal will generally be higher in frequency than the operating frequency of modulation generator 4, so that high pass filter 7 is selected to pass the higher frequency, but to reject the modulation frequency of generator 4. The amplified signal is then passed by audio amplifier 8 through a conventional limiter 9 to discriminator 13. The output of frequency discriminator 13 is a unidirectional current whose amplitude is proportional to target or obstacle relative speed. Superimposed upon that output of the conventional discriminator 13 is an alternating component whose amplitude is proportional to the range of the reflecting object.

The unidirectional current output of discriminator 13 (the signal proportional to target or object relative speed) is supplied to a conventional voltage comparator 10, to a second input terminal 11a of which is supplied a reference voltage from a conventional stable reference signal source (not shown). Depending upon the relation of the magnitudes of the voltages on inputs 10a, 11a of voltage comparator 10, an enabling signal is applied to terminal 12b of the conventional AND gate or coincidence detector 12. When the relative speed of the car B or other obstacle is above a certain value as identified by voltage comparator 10, an enabling signal level is fed to terminal 12b.

The second or alternating current component of the output of discriminator 13 (whose amplitude is proportional to object range) may be passed by the conventional band-pass filter 15 to a conventional demodulator 16. Filter 15 is tuned to the operating frequency of modulation generator 4 for this purpose. The demodulated (16) output signal is a unidirectional one of amplitude also proportional to object range, and this demodulated signal is supplied to a first input of a voltage comparator 17 similar to voltage comparator 10. Comparator 17 is also supplied with a fixed reference voltage, when switch 18 is positioned as shown, from a conventional supply (not shown) coupled to terminal 11b. The output of comparator 17 is applied to terminal 12c to enable AND gate or coincidence detector 12, after inversion if necessary by inverter 20, when the range of the target or obstacle falls below a predetermined value according to the level of the reference voltage supplied to comparator 17 at terminal 11b.

The provision of an enabling signal on terminal 12c may be modified so as not only to be dependent on the stable reference voltage of terminal 11b, but so as to be a function of relative speed between cars A and B by moving switch 18 to terminal 19. In this condition, the unidirectional signal proportional to target relative speed is applied through a conventional voltage divider or attenuator circuit 14 to determine the operating point of voltage comparator 17.

The third signal for enabling AND circuit 12 is coupled to terminal 12a thereof. It is generated by supplying the output of audio amplifier 8 to the conventional demodulator 25. The output of demodulator 25 is coupled as one input to the conventional voltage comparator 26 whose other input at terminal 11c is supplied from a suitable stable signal source (not shown). In fact, the three reference voltage terminals 11a, 11b, and 11c may be supplied in common from the same stable source. This third input at terminal 12a of AND gate 12 represents a presence signal.

According to the invention, three signals may be simultaneously present as inputs to AND gate 12:
 a. a signal on terminal 12a representing the presence of obstacle B,
 b. a signal on terminal 12b indicating that the range rate or differential speed of the antenna 5 relative to obstacle B is greater than a predetermined value, and
 c. a signal on terminal 12c indicating that the range or distance between antenna 2 and the obstacle B is below a predetermined value. The three such signals represent a condition in which a collision between the vehicle A and the obstacle B is certain to occur and collectively produce an output during their simultaneous presence at AND gate 12 for supply to actuator device 30, the latter being adapted to actuate an actuatable device 31 such as a passenger protective device, as will be explained.

Operation of the invention will be clear from the foregoing discussion. It is seen that the invention is a simple precollision sensor device adapted for exciting a triple-coincidence arming circuit, with reduced susceptibility to undesired false alarms. Frequency modulated high frequency carrier transmissions may be directed forwardly from a protected vehicle A toward any object B, such as the rear of a second vehicle being approached by the protected vehicle A. Relative motion between the protected and detected vehicles will produce a Doppler shift in the carrier signal reflected into antenna 2. The fact that the carrier, when transmitted, is frequency modulated, causes the echo Doppler signal to be higher when the carrier frequency is increasing and correspondingly lower when the carrier is decreasing. Consequently, the Doppler signal seen when oscillator-detector 1 is performing its receiver function is frequency modulated at the rate set by modulation generator 4 by an amount dictated by the frequency modulation excursion and by the instantaneous range of the detected vehicle or other obstacle B. This frequency modulated Doppler signal appears across the oscillator-detector 1 diode along with the modulating signal from generator 4.

For relative vehicle-obstacle speeds of interest, the frequency of the Doppler signal will be well above the frequency of th modulation generator 4; consequently, the Doppler signal after detection is passed to amplifier 8 by high pass filter 7, while the modulation generator (4) signal is rejected by filter 7. Demodulator 25, fed directly by amplifier 8, and voltage comparator 26 are used to inspect the character of the output of amplifier 8 and to provide an enabling signal at terminal 12a when the received signal level is adequate to operate the signal channels that supply terminals 12b, 12c. This prevents the possiblity of triggering the actuator 30 on internal noise of the receiver system.

The audio outout of amplifier 8 is then limited by limiter 9 and is discriminated. The output of discriminator 13 is a unidirectional voltage of level proportional to relative vehicle-obstacle speed with a superimposed alternating component proportional to instantaneous obstacle range. When the relative speed is above a predetermined value, as identified by voltage comparator 10, a second input is supplied to AND gate 12 (via terminal 12b). The alternating component, whose amplitude is proportional to vehicle-obstacle range, is used to generate an enabling signal only when that range falls below a predetermined value. The minimum range predetermined value may be fixed according to a stable reference voltage, or may be made a function of vehicle-obstacle relative speed by supply of a version of the relative speed signal to the reference terminal 19 of voltage comparator 17.

The output of actuator 30 appearing at terminal 40 may be beneficially employed in various ways; it may be used to operate a visual or audible warning device 31 for warning of the impending collision event or may be used to actuate conventional protective devices, such as inflatable gas bag devices, for reducing the possiblity of injury to a passenger whose body would otherwise strike the instrument panel or other parts of the vehicle. For example, the output at terminal 40 may be applied to operate a lamp that may be viewed by occupants of the vehicle. A horn (not shown) having a strident tone may be actuated by the output of actuator 30 for warning purposes.

Various other protective devices 31 may similarly be operated by actuator 30, such as a conventional gas bag restraint device of the kind shown in the C.T.Nations patent application Ser. No. 205,592, filed Dec. 7 1971, entitled: "Vehicle Safety Apparatus," and assigned to the Sperry Rand Corporation. This safety apparatus comprises, in general, a container or reservoir of a gas-producing medium and a pipe with a plurality of gas diffusing slots. The reservoir contains a conventional actuating mechanism for controlling release of gas from the medium within the container so that it flows through the diffuser slots into the gas bag, causing the latter rapidly to expand.

The release of gas may be brought about by a signal applied at terminal 40 for causing a detonator to explode an explosive substance held within the container. The gas produced by the explosion forces its way out of the container into the pipe and through the slots. Alternatively, the presence of a signal on terminal 40 may be used to cause a valve to release gas from a high pressure storage vessel. Other arrangements are known to those skilled in the art.

Flow of gas from the diffuser slots causes inflation of the gas bag. The inflatable bag is normally in a dormant, collapsed, and folded condition, and may be aesthetically contoured so as to give the general appearance of a continuation of the vehicle instrument panel. The inflatable bag is secured in sealed relation about the diffuser pipe, and is therefore inflated to the active position upon release of gas from the container. In the event that a collision is certain, the gas bag is thus expanded rapidly, forming a cushion between occupants and the vehicle instrument panel, and restraining passengers so that they do not collide with the instrument panel or windscreen as the vehicle is rapidly decelerated. It will be understood by those skilled in the art that additional gas bags in other locations within the vehicle may be used to protect other passengers from impact with the sides or other parts of the vehicle interior. Furthermore, the output of actuator 30 at terminal 40 may be supplied to a suitable means such as a solenoid for actuating vehicle brakes, assuming that they have not already been applied by the vehicle driver, or for extending exterior bumpers. While automatic actuation of brakes may not necessarily diminish the actual change of collision, at least some of the vehicle energy will be dissipated in an actual collision, reducing consequent destruction of life and property.

It is seen that the novel collision sensor system provides reliable and repeatable operation through the use of non-mechanical apparatus for detection of a collision situation prior to the event, rather than being dependent upon mechanical forces generated in an actual collision. Sensing of the impending event is accomplished immediately prior to the contact of the protected vehicle with another vehicle or other object for the reliable actuation of passenger restraint or other protective devices. Modulated continuous wave high frequency transmitter-receiver apparatus of simple, compact, and reliable nature is employed for sensing the potential event. The simple sensor provides a trio of output signals for preset combinations of obstacle presence, closing differential speed, and minimum range, all of which must be present for actuation of the vehicle protective device, the apparatus accordingly being relatively immune to false alarm operation. The band width of all circuits is relatively low as compared to those of conventional frequency modulation and pulse ranging systems, leading to a simple, inexpensive system and to more efficient use of the available radio spectrum.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Vehicle safety apparatus comprising:
   directive oscillator-detector radio signal means adapted to be carried on said vehicle for directing frequency modulated transmissions toward an object and for receiving reflected signals therefrom,
   frequency discriminator means responsive to said oscillator-detector radio signal means for producing a first output signal having an alternating component whose amplitude is substantially proportional to the range between said vehicle and said object and having a unidirectional component whose amplitude is substantially proportional to the relative speed of said vehicle and said object,
   first series circuit means responsive to said unidirectional component for supplying a second output signal indicating the presence of said object only when reflected signals are received therefrom, said first series circuit means including:
   first comparator means responsive to said unidirectional component and to a first reference signal for supplying a third output signal only when said relative speed exceeds a predetermined value,
   demodulator means responsive to said first comparator means and to said oscillator-detector radio signal means, and
   second comparator means responsive to said demodulator means and to a second reference signal for generating said second output signal,
   second series circuit means responsive to said alternating component for supplying a fourth output signal only when said range falls below a predetermined value, and utilization means responsive only to the simultaneous presence of said second, third, and fourth output signals.

2. Apparatus as described in claim 1 wherein said utilization means includes coincidence detector means for providing a control output only in the presence of said second, third, and fourth output signals.

3. Apparatus as described in claim 2 wherein said utilization means further includes actuatable means responsive to said coincidence detector means control output comprising passenger protection means.

4. Apparatus as described in claim 1 wherein said oscillator-detector radio signal means includes:
diode oscillator-detector means having single port means,
directive antenna means coupled to said single port means, and
modulation generator means for frequency modulating said oscillator-detector means.

5. Apparatus as described in claim 4 including filter means coupled between said diode-oscillator detector means and said frequency discriminator means for rejecting the frequency modulation signal of said modulation generator.

6. Apparatus as described in claim 1 wherein said second series circuit means includes third comparator means responsive to said alternating component and to a third reference signal for generating said fourth output signal.

7. Apparatus as described in claim 6 wherein said third reference signal is supplied by said frequency discriminator means.

* * * * *